United States Patent

[11] 3,633,418

[72] Inventor Kenneth R. Larson
    Des Plaines, Ill.
[21] Appl. No. 822,624
[22] Filed May 7, 1969
[45] Patented Jan. 11, 1972
[73] Assignee Snap-On-Tools Corporation
    Kenosha, Wis.
    Continuation-in-part of application Ser. No. 735,401, June 7, 1968. This application May 7, 1969, Ser. No. 822,624

[54] ADJUSTABLE TORQUE WRENCH TRANSLATING DEVICES
    12 Claims, 9 Drawing Figs.
[52] U.S. Cl.......................................................... 73/139
[51] Int. Cl........................................................... G01l 5/24
[50] Field of Search............................................. 73/1, 139, 362.1, 362.4, 233, 266, 543, 540, 531, 498, 417, 415, 397; 116/129

[56] References Cited
    UNITED STATES PATENTS
    438,208  10/1890  Wallace.......................  73/233 X
    620,939   3/1899  Lee.............................  73/281
    863,014   8/1906  Becherer......................  73/531
    2,715,333  8/1955  Larson........................  73/139

Primary Examiner—Charles A. Ruehl
Attorney—Harry C. Alberts

ABSTRACT: A torque-measuring wrench that effectively and accurately translates the twist in a work-engaging member to a calibrated meter spaced therefrom through an improved elongate twist-translating member operatively disposed therebetween that maintains a fixed meter-actuating moment arm for each setting, and provides for the convenient straight line moment arm adjustment between the translating member and the calibrated meter to enable simple and accurate calibration corrections by the user to insure precise measurements commensurate with the applied turning load. The translating member is of comparatively light nonflexible construction to render such irresponsive to abnormal deflections when the prescribed manual application of the turning force is inadvertently applied during the use thereof. This is accomplished with an improved twist-translating arm and mount therefor which embodies an improved straight line moment arm that is capable of adjustable setting with the calibrated meter operating lever through a removable housing closure without dismantling any part of the wrench assembly.

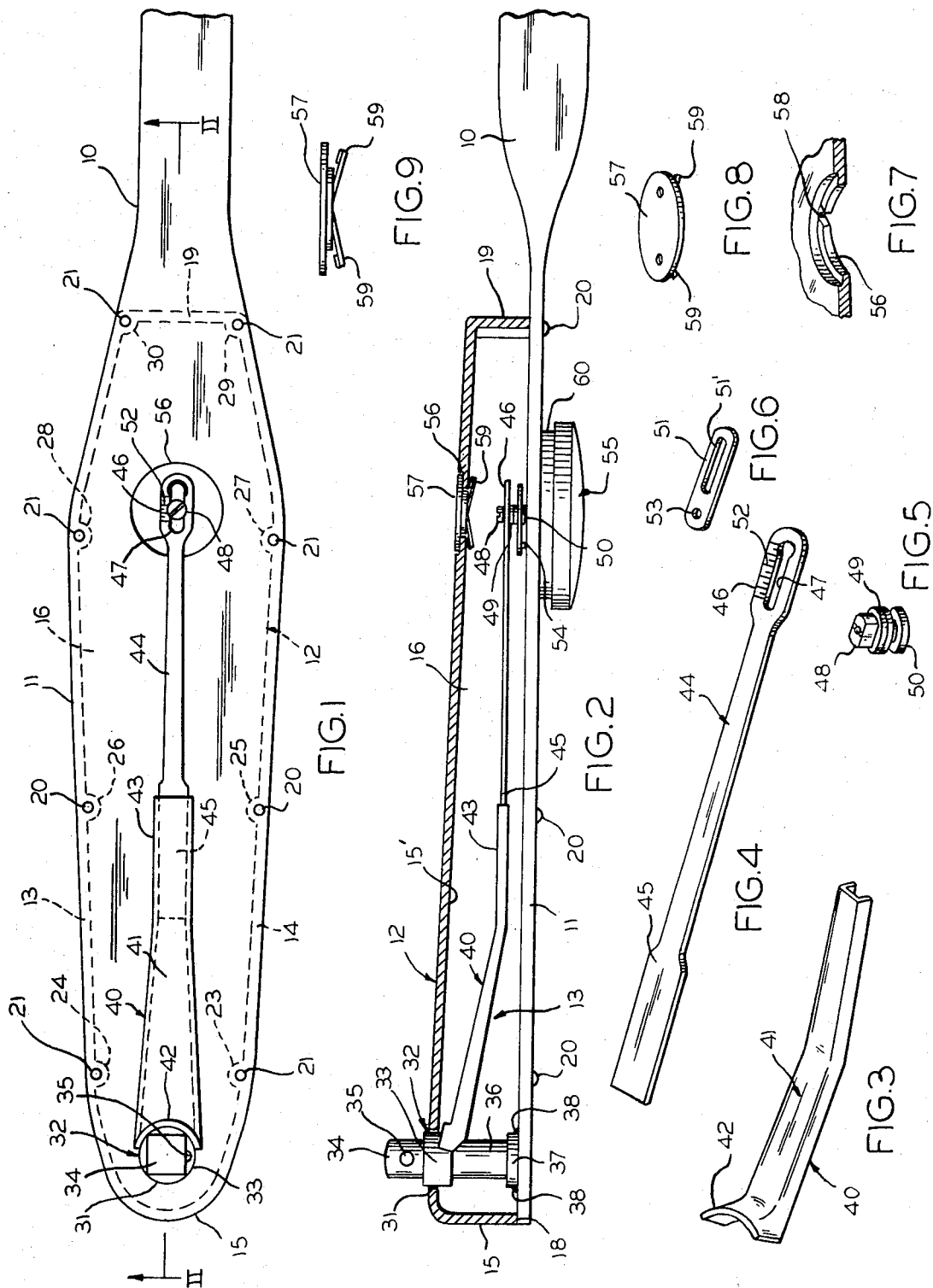
INVENTOR
KENNETH R. LARSON
BY Harry C. Alberts
ATTORNEY

ADJUSTABLE TORQUE WRENCH TRANSLATING DEVICES

This application is a continuation-in-part of my copending application Ser. No. 735,401, filed June 7, 1968.

This invention relates to turning devices and more particularly to torque-measuring wrenches of the type disclosed in U.S. Letters Pat. Nos. 2,312,104; 2,314,623; 2,715,333 and application Ser. No. 735,401 filed June 7, 1968, although certain features thereof may be employed with equal advantage for other purposes.

It contemplates more especially the provision of an improved, more dependable and accurate torque-measuring wrench which embodies a straight line translating moment arm which maintains a fixed moment arm during the operating operatively connected adjustably between the work-engaging member and the calibrated measuring meter, and which affords convenient access thereto through the casing for corrective adjustment by the user.

Most torque wrenches measure the flex in a beam which resists the turning force of a wrench in order to measure the amount of torque or force applied in nut turning and similar operations. Then, too, the amount of torque has been measured by determining the degree of twist in a shank or shaft. The latter type of a measuring wrench is substantially free from internal stresses and friction in the moving parts and is adjustable to compensate for temperature, material fatigue, and climatic variations to accurately designate the force applied in nut turning and similar movements over extended periods of use without entailing the time, inconvenience and expense of factory service for that purpose.

The desirability of utilizing the degree of twist in the shank or shaft as the measuring expedient in nut turning and similar operations has not been accomplished with the utmost advantage. In order to preserve more accuracy in use of such torque wrenches, the degree of twist should be translated to an indicator at a point of maximum displacement through a translating member which maintains a fixed moment arm during the operating thereof; that is non-flexing irrespective of distortions due to the abnormal directional application of manual force for turning the work engaging member, and provides for convenient straight line moment arm adjustment so that accurate measurements are insured by compensating for temperature, fatigue, and climatic conditions. These improvements reduce the error factor to a minimum and result in more effective twist translation instrumentalities involving an elongated twist translating member that is adjustably connected to an axial meter mount in a manner embodying teachings of the present invention. This expedient affords straight line adjustment through an opening in the housing that is fitted with a readily removable closure for that purpose. Further, the translating member is proportioned and constructed to be rigid in the measurable plane of twist and comparatively flexible in all other directions to avoid the introduction of mismovements due to abnormally directed and manually applied force.

The importance of accuracy in torque wrenches cannot be over-emphasized, and the degree of accuracy depends largely upon (1) maintaining a fixed moment arm between the work-engaging member and an axial meter mount through the elongated translation member serving as the actuator for the meter mechanism to avoid variations due to the change in the effective length of the meter lever in previous embodiments with each resetting adjustment and (2) the elimination of or substantial reduction in or compensation for fatigue friction, lag and free-play between relatively moving parts. This is also important in torque wrenches that embody the principle of flexing a torque-resisting beam to provide the desired reading; however, better results have been found possible in torsion type wrenches embodying teachings of the present invention particularly with the improved translating and compensating instrumentalities embodied herein.

The straight line adjustment between the elongated translation member and the axial meter mount insures a constant moment arm with each adjustment, and this is an important departure from previous structures which embodied a pivotal meter lever adjustment relative to the translating member that varied the effect of the moment arm by reason of the compound movement therebetween. It must be borne in mind that a rotating lever and a linear translation member connection does not provide a uniform linear displacement around the entire circular path of meter lever rotation so that the provision of an axial meter mount constitutes a substantial advantage coupled with the improved twist-translating member having a straight line adjustable connection with the indicator or meter parts. Torque measurements are possible, therefore, with minimum error introduction or with a negligible error factor, and nut turning operations are accurately measured under all conditions and capacities irrespective of the position or any inadvertent directional error of applied force along the lever arm effecting the turning operation. With such a translating member and adjustable meter connection, the user can compensate for climatic variations, material fatigue and variations in the measuring meter.

One object of the present invention is to simplify the construction and improve the operation of torque-measuring wrenches of the character mentioned.

Another object is to provide a simple and compact torque measuring wrench of the lever arm type that is accurate and dependable in operation over extended periods and that can be adjusted to compensate for variations in its readings irrespective of any deflections introduced by inadvertent adverse directional force applied for nut turning.

Still another object is to provide a torque-measuring turning tool having improved rigid and nonflexing torsion-translating means in the plane of rotation with straight line adjustable connection means with the calibrated meter for insuring constant measuring characteristics through a constant moment arm therebetween for any predetermined setting.

A further object is to provide a turning tool with a shank subjected to twist for operating measuring instrumentalities with a translation member rigid in the normal plane of applied force and comparatively flexible in other different directions and having an exteriorly accessible straight line connection with an axial mount calibrated meter for providing more accurate responses.

A still further object is to provide a torque wrench with a turning shank having an improved rigid torsion translating and torque-adjusting means extending therefrom for improved straight line adjustable operative connection with the measuring instrumentalities.

Still a further object is to provide a wrench having a rigid handle element for attachment of a turning shank to a rigid plate extension thereof for applied turning movement to provide a calibrated twist therein through a light, rigid, and adjustable straight line translating member adjustably connected to measuring instrumentalities at a point of greatest displacement.

Other objects and advantages will appear from the following description of an illustrative embodiment of the present invention.

In the drawing:

FIG. 1 is a bottom plan view of a wrench embodying features of the present invention with the casing cover plate removed to illustrate the inner instrumentalities thereof.

FIG. 2 is a fragmentary sectional view taken substantially along line II—II of FIG. 1.

FIG. 3 is a perspective view of an arcuate reinforcing translation shank arm mount shown in position in FIGS. 1 and 2.

FIG. 4 is a perspective view of the torsion shank translating arm extension normally disposed between the shank arm and measuring instrumentalities.

FIG. 5 is an enlarged perspective view of a meter lever connector that movably supports the translation arm extension.

FIG. 6 is a perspective view of the meter lever for connection between the meter shaft and the twist translation member.

FIG. 7 is a fragmentary perspective view of the housing plate opening for enabling accessible exposure of the translation connector for compensating adjustment thereof.

FIGS. 8 and 9 are perspective views of a readily detachable closure for the opening shown in FIG. 7.

The structure selected for illustration comprises a suitable handle member 10 of standard construction that terminates in an elongated rigid steel plate 11 stamped or otherwise shaped from sheet material or the like for sustaining the measured turning load with specified capacities. A housing 12 having an elongated chambered body is stamped or otherwise shaped from suitable metal to present inclined sidewalls 13 and 14 terminating in a semicircular end or head extremity 15. It will be observed that the handle plate 11 and confronting housing 12 consists of the inclined sidewalls 13–14 which diverge and then converge in the direction of the handle 10 and also toward the bottom wall 151 formed integral therewith to define an elongated chambered interior 16.

The housing 12 is shaped to conform with the configuration of the handle plate 11 to fit over an upstanding peripheral housing edge 18 disposed opposite the bottom wall 15 to confront therewith and serve as a complement thereof. The handle extremity 19 of the chamber 16 is larger or wider in size and not of the semicircular configuration as the head extremity 15; however, this may vary within a wide range depending upon the dictates of commercial practice. The peripherally flanged open edge 18 of the housing 12 extends around the sidewalls 13–14 and their semicircular head and handle extremities 15 and 19. The rigid face of the handle plate 11 is shaped to correspond with the flanged open peripheral edge 18 including its semicircular head 15 and rather straight handle extremity 19, respectively, to enclose the measuring instrumentalities as will appear more fully hereinafter.

A plurality of threaded screw fasteners 20 project through apertures 21 in the rigid handle plate 11 to engage correspondingly threaded bores in the peripheral housing edge 18 that extend along the sidewalls 13–14 of the housing 12 and its ends, thereby enclosing the chamber 16 and confining the torsion displacing, indicating, and measuring instrumentalities to be described hereinafter. It will be noted that the handle plate 11 and especially the inclined sidewalls 13–14, are reinforced in the region of the threaded bores by increasing the thickness of the peripheral flange 18 as at 23–24, 25–26, 27–28 and 29–30 so that the comparatively rigid and load-carrying handle plate 11 can be effectively attached to the housing 12 which is greatly strengthened and reinforced therewith.

In fact, the housing 12 does not sustain any appreciable turning load and primarily serves to confine the measuring instrumentalities as a protection against foreign substances and impacts. The handle plate 11 is sufficiently rigid to avoid any flex, distortion or consequential variation under turning load. The semicircular head 15 of the housing 12 is provided with a circular recess 31 corresponding substantially in curvature therewith and sized to receive a revoluble working-engaging member 32 of substantially corresponding size for free rotation therein. The revoluble work-engaging member 32 has an annular shoulder 33 formed, in this instance, integral therewith immediately above a polygonal wrench socket receiving extremity 34 which terminates beyond the bottom wall 15' of the housing 12 for projecting through the circular recess 31 provided in the head 15. A spring-impelled detent 35 of standard construction is provided in a face of the polygonal extremity 34 for cooperation with a correspondingly sized and shaped recess provided in a wrench socket or other turning implement that is telescoped thereon for retention thereon against accidental detachment.

Wrench sockets or other turning implements (not shown) would normally be provided with a recessed shank shaped and sized to conform with the polygonal extremity 34 of the work-engaging member 32 so that the friction exerted by the spring-impelled detent 35 would be effective in retaining the turning implement thereon against accidental removal. As shown, the work-engaging member 32 has a cylindrical shank 36 constituting a turning shank which, in this instance, is formed integral with the annular shoulder 33 and polygonal extremity 34 in axial relation therewith. The cylindrical shank 36 terminates for contact at its polygonal stationary shoulder 37 with the interior head portion surface of the plate 11 for welded joinder therewith around the circumference 38 of the polygonal stationary shoulder 37 of the shank 36. This rigidly anchors and attaches the shank 36 to the handle plate 11 so that they operate as a single fixed member. The head portion of the handle plate 11 has a semicircular extremity that conforms in size and shape with the semicircular head 15 of the housing 12.

With this arrangement, the work-engaging member 32 projects through the chamber 16 of the housing 12 so that the polygonal extremity 34 will be exteriorly accessible beyond the casing bottom for engagement and disengagement with turning members such as wrench sockets and the like. It should be noted that the revoluble work-engaging turning member 32 is rigidly attached to the handle plate 11 that is preferably of rigid and nonyielding material such as steel while the housing 12 may be cast or otherwise shaped from aluminum in that the revoluble work-engaging member 32 is mounted for movement relative thereto in sustaining the turning load. The housing 12 does not directly carry any appreciable load. Turning movement is imparted to a fastener such as a threaded nut through a wrench socket attached to the polygonal shank 34 of the revoluble work-engaging member 32 responsive to manually applying force or effort to the handle 10 in one direction or another.

In order to measure the extent to which any fastener such as a threaded nut is applied through the manipulation of the handle 10, the extent of twist sustained by the cylindrical shank 36 of the revoluble work-engaging member 32 is determined in that this will be uniform for any predetermined applied force and will vary proportionately to the turning load imparted through the handle 10 that is primarily sustained by the rigid handle plate 11. It will be observed that any turning movement applied to the handle 10 will be transferred to the handle plate 11 which, in turn, will rotarily displace the revoluble work-engaging member 32 carrying a nut or other turning implement to the end that proportional twist is imparted to the cylindrical shank 36 anchored to the handle plate 11 at shoulder 37 and free to twist at the extremity 34 responsive to carrying the turning load.

In order to measure to degree of twist or torsion imparted to the cylindrical shank 36 of the revoluble work-engaging member 32 responsive to any turning operation, an elongated twist-translating member 40 better termed a twist-translating arm projects radially from the annular shoulder 33. The twist-translating elongated arm 40 comprises, in this instance, a tapered plate member 41 having a vertically offset arcuate end 42 transversely arcuate for fitting contact with the shank 36 under the annular shoulder 33 for welded joinder therewith. The arm 40 is inclined upwardly to provide a substantially horizontally disposed end region 43, and this arm is channelled to present a substantially U-shaped cross section to provide a rigid mount for an elongated flat arm extension 44 having an enlarged end 45 that is press-fitted into the channelled end of the arm 40 to operate as an integral translation member.

As stated, the translation member actuator arm is preferably though not essentially stamped from sheet material to present spaced upstanding guide channels for rigidity and lightness, and to frictionally receive the enlarged end 45 of the flat arm extension that projects longitudinally of the housing 12 for confinement therein. So that the housing 12 together with its associated instrumentalities may be as compact as possible, the arm extension 44 is preferably disposed in the plane of the tapered plate member 41 (FIG. 2) to avoid contact with either the bottom 15' or handle plate 11. The extension 44 is free to circumferentially move or oscillate for a limited extent depending upon the degree and direction of twist imparted to the revoluble shank 36 responsive to sustaining the turning load relative to the handle plate 11. This plate member 41 is light but rigid in the plane of turning movement to turn responsive to the twist of the shank 36, but is comparatively flexible in a plane normal or angularly thereof to avoid transmitting any other handle movements inadvertently applied by the user. This arrangement balances the instrumentalities symmetrically of the load-carrying annular shoulder 33 so as to avoid any flex therein irrespective of the position of the load-applying handle 10 and that of its plate 11.

The elongated indicator displacing twist-translating actuator need only be heavy enough to overcome the nominal friction in the measuring instrumentalities and the twist load incident to the operation thereof without causing any flex or distortion therein due to its own weight or in translating the torsional displacement of the shank 36. Its thickness and flare, however, may be determined by other factors such as the elimination of backlash and conditions of abuse in actual nut-turning operations. For that reason, the elongated twist-translating arm actuator in actual practice may be somewhat heavier than otherwise required merely to carry a comparatively negligible load of operating the measuring instrumentalities without any flex therein; therefore the channelled cross-sectional construction of the elongated arm 40 is thought to be highly advantageous.

It should be observed that the flat elongated extension 44 will yield in a direction of handle applied force other than in the plane thereof to avoid translation of any misapplied handle force. This relatively thin and flat extension 44 has a somewhat enlarged elliptical end 46 which is provided with an elongated slot 47 (FIG. 4) to receive a shouldered or other complementary-shaped and axially threaded stud or head 48 therethrough for engagement with a pair of swivel collars 49–50. The lowermost end collar 50 may be integral with the stud extremity while an intermediate swivel collar 49 is threaded thereto to tightly engage a slotted meter lever arm 51 (FIG. 6) for adjustable positioning therealong and the slot 47 of the end 46 which is graduated as at 52 to simplify adjustment therealong. The swivel collar connector assembly rotates around the pivotal end aperture 53 (FIG. 6) of the meter-actuating lever arm 51 which allows for dial trigonometric secant factors owing to the combined rotary and linear displacements involved in such movements as fully described in assignee's copending application Ser. No. 862,615 filed Sept. 8, 1969. The lever arm 51 is attached through its end aperture 53 to the stud shaft 54 (FIG. 2) of the calibrated meter 55 fixed exteriorly to the handle plate 11 proximate to the handle 10 thereof. In order to provide accessibility to the threaded stud 48 for adjustment along the graduated slot 47 of the extremity 46, a circular-dished opening 56 (FIG. 7) is provided in the housing 12 to receive a closure plate 57 that have complemental bayonet slots and studs 58–59 thereon to provide a simple and easy removable connection therebetween (FIGS. 7, 8, and 9). This affords simple and ready straight line adjustment by the user to correct any variation between the reading on the calibrated meter 55 and a suitable test and checking device of which there are suitable types available in any industrial operation for test comparisons at convenient intervals.

With this arrangement, the slotted extremity 46 is adjustably connected to the meter lever arm 51 within the limits of their respective slots 47 and 51' to enable longitudinal adjustment of the stud or head 48 relative to the meter 55 fully disclosed and described in the aforesaid letters patents and to be hereinafter briefly described. Since the meter-turning slotted lever arm 51 is longitudinally aligned with and disposed beneath the extension 44 with their slots 47 and 51' in registry when there is no load on the shank 36, the threaded stud head 48 is in straight line displacement along the slots 47 and 51' and can be moved therealong when loosened with a screwdriver. This renders the adjustment thereof along the graduated slot 47 readily calculable as no tangential or secant adjustment paths need be taken into account, and by experience the user can readily determine the extent of adjustment depending upon how much the meter 55 is off based upon test with a checking device usually available in industrial operations. The importance of this straight line adjustable connection is that a constant moment arm is maintained between the work-engaging member 32 and the meter stud 48 for any setting, and this insures measurements with accuracy for the entire capacity range thereof.

The longitudinal connection adjustment of the end 46 will vary the extent to which the dial mechanism is actuated or displaced responsive to a predetermined torsional stress imparted to the shank 36 of the work-engaging member 32. This enables also the replacement of the translation flat plate arm extension 44 should occasion demand or should such become impaired in any nut-turning operation such as an accidental and abrupt full load manual release of the handle 10. It should be noted that the extension 44 is of a comparatively thin wide dimension so that the latter will be highly flexible to protect the delicate indicator and measuring mechanism in the event of backlash caused by the sudden manual release of the handle 10 while loaded, and this backlash will be absorbed by the flexing thereof which serves as a recoiling expedient under such conditions; however, the extension 44 functions exactly the same even though these were produced in a manner to constitute an integral unit with the tapered plate member 41. The latter construction would be somewhat more expensive from a production standpoint than the segmented translation member serving as an actuator for measuring instrumentalities such as the meter 55 when displaced by the twist imparted to the shank 36.

The meter 55 which is assembled as a unit with the dial casing plate 60, is attached in any suitable manner to the exterior surface of the handle region of the handle plate 11. Consequently, the measuring and indicator mechanism can be attached to the handle plate 11 together with the revoluble work-engaging member 32 and its torsion displacing translating member. The handle plate 11 together with these instrumentalities are, in turn, attached for confinement in the chamber 16 of the housing 12 by means of fasteners such as the threaded studs 20. It will be apparent from the foregoing arrangement of parts that a manual-turning force applied to the handle 10 in either direction will impart a corresponding turning effect to the revoluble work-engaging member 32. This creates a slight twist in the shank 36 which can be measured with the advantage procured through the elongated moment arm dial indicator-translating member therebetween.

Any inadvertent load-applying force in an upwardly or downwardly inclined direction or directions that are beyond the desired load-turning plane of the fastener being wrenched, would not distort the true measurement of the turning load. This is accomplished by the thin flat extension 44 which is light in construction and comparatively flexible in a direction normal to the flat surface thereof and yet very rigid in the plane of its flat surface which is also in the plane of the applied turning load for fastener tightening. This turning operation is transmitted to a suitable tool or implement or fastener such as a threaded nut which requires a predetermined turning load in securing it to the desired degree of tightness for the suitable performance of its intended function. This turning movement and sustained turning load will create a fractional twist in the revoluble work-engaging member 32 between its annular shoulder 33 (FIG. 2) and the polygonal stationary shoulder 37. This fractional twist created by the torsional effect on the cylindrical shank 36, will be translated to and operate the measuring instrumentalities 55 through the elongated translation member. The degree of twist or torsional strain within the shank 36 is measured at the extreme end of the elongated extension 44 which is the point of its greatest displacement.

As a result, the translation member will accentuate the twist created in the shank 36 to proportionally and accurately displace the indicator pointed to an extent proportional to the length of the elongated translation member. The measurement of the twist imparted to the shank 36 at a point of maximum displacement of the comparatively long twist-translating member together with the maintenance of a constant moment arm are important factors in producing accurate readings. Then, too, the plate arm extension 44 need only be heavy enough to overcome the comparatively negligible force required to actuate the measuring instrumentalities so that comparatively little friction is encountered between the revoluble workeengaging member 32 and the measuring instrumentalities 55. This is conducive to accuracy accomplished with utmost simplicity in construction and operation.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A torque wrench, the combination with an elongated handle plate member of torsion resisting work-engaging head means anchored substantially normal to said handle plate member opposite to the handle end thereof, an elongated torsion-translating member anchored at one end to said work-engaging head member and extending along said handle plate member in spaced relation thereto, said elongated torsion-translating member extending freely along and substantially parallel to said handle plate member calibrated indicating meter means on said handle plate member for operative connection to the end region of said torsion-translating member to measure the turning load on said work-engaging head member and translated thereto by said elongated torsion translating member with a substantially fixed moment arm for any setting responsive to sustaining a turning load with a turning force applied to said handle plate member, a meter-actuating lever, said meter-actuating lever and said end region of the torsion-translating member defining initial noload aligned and superposed means to provide a dial trigonometric secant factor of low magnitude for any setting, and adjustable securing means between said last named aligned and superposed means for slightly changing the moment arm setting between said work-engaging head means and said means meter for correcting any inaccuracies therein.

2. A torque wrench as defined in claim 1 wherein the elongated torsion-translating member is a thin plate anchored at one end to said work-engaging head means and having a rigid thin plate extension provided with an elongated slot proximate to its other end for registry with a slot form in said meter-actuating lever.

3. A torque wrench as defined in claim 2 wherein said thin plate has its planar surface parallel to said handle plate member and its maximum rigidity is substantially in the plane of the handle applied turning load movement.

4. A torque wrench as defined in claim 1 wherein said elongated torsion-translating member terminates in a slotted end aligned with said meter-actuating lever which is correspondingly slotted, adjustable securing means providing a pivotal connection therebetween.

5. A torque wrench as defined in claim 4 wherein said adjustable securing means comprises a swivel collared and threaded stud which adjustably connects said slotted translating member and meter actuating lever together to enable their linear relative adjustment for maintaining accurate torque meter indications.

6. A torque wrench as defined in claim 4 wherein a housing covers said handle plate member, and a detachable circular closure having a bayonet-slotted connection therewith is provided in said housing in the region of the adjustable securing means.

7. A torque wrench as defined in claim 6 wherein the slot in raid translating member is graduated.

8. A torque wrench as defined in claim 7 wherein the adjustable securing means comprises a swivelly collared threaded stud accessible by removing said housing closure in the region thereof.

9. A torque wrench as defined in claim 1 wherein a housing covers said handle plate member, and a detachable closure is fitted to an opening in said housing in the region of said adjustable securing means.

10. A torque wrench as defined in claim 9, wherein the adjustable securing means comprises a collared adjustment stud which is accessible through said detachable housing closure.

11. A torque wrench, comprising an elongated handle plate member having an unobstructed work-engaging head end opposite to a handle end, a torsion-resisting work-engaging head member anchored substantially normal to said handle plate member proximate to the unobstructed head end of said handle plate member, an elongated comparatively thin flat plate torsion-translating member anchored at one end thereof to said work-engaging head member and extending along said handle plate member in spaced relation thereto, said elongated torsion-translating member having a channelled rigid portion with an elongated flat yieldable extension thereon, said flat extension being without flex or yield in the plane thereof while being flexible in all other directions of exertion thereon or extending intact freely along and substantially parallel to said handle plate member without sustaining the work-resisting load of said work-engaging head member, calibrated indicating means on said handle plate member proximate to the handle end thereof for operative connection to the end region of said torsion-translating member to measure the turning load on said work-engaging head member and translated thereto by said elongated torsion-translating member responsive to sustaining a turning load with a turning force applied to said handle plate member, and linearly adjustable means between said flat extension and said calibrated indicating means for adjustably connecting the end region of said torsion-translating member to said calibrated indicating means for resetting the moment arm therebetween to restore the accuracy of the calibrated indicating means.

12. A torque wrench as defined in claim 11 wherein the elongated flat yieldable extension on said torsion-translating member is anchored at one end to said channelled rigid portion and said flat yieldable extension has a slotted region at its other end for registry with a correspondingly slotted arm on said calibrated indicating means to serve as an actuator therefor, and said linearly adjustable means comprises a swivel adjustable threaded connector between said flat extension and the slotted arm of said calibrated indicating means through the medium of the superposed slots therein to maintain a constant moment arm commensurate with accurate load registration on said calibrated indicating means.

* * * * *